US012795798B2

(12) United States Patent
Zhan et al.

(10) Patent No.: US 12,795,798 B2
(45) Date of Patent: Nov. 10, 2026

(54) DIMMING CIRCUIT WITH A LOAD CAPACITY ADJUSTMENT MECHANISM AND METHOD THEREOF

(71) Applicant: Xiamen PVTECH Co., Ltd., Xiamen (CN)

(72) Inventors: Hong Sheng Zhan, Xiamen (CN); Fuxing Lu, Xiamen (CN)

(73) Assignee: Xiamen PVTECH Co., Ltd., Xiamen (CN)

( * ) Notice: Subject to any disclaimer, the term of this patent is extended or adjusted under 35 U.S.C. 154(b) by 77 days.

(21) Appl. No.: 18/930,990

(22) Filed: Oct. 29, 2024

(65) Prior Publication Data

US 2025/0331081 A1 Oct. 23, 2025

(30) Foreign Application Priority Data

Apr. 19, 2024 (CN) ......................... 202410474689.5

(51) Int. Cl.
*H05B 47/10* (2020.01)
*H05B 45/10* (2020.01)

(52) U.S. Cl.
CPC .................................... *H05B 47/10* (2020.01)

(58) Field of Classification Search
None
See application file for complete search history.

(56) References Cited

U.S. PATENT DOCUMENTS

2003/0214242 A1* 11/2003 Berg-Johansen ...... H05B 45/12 315/307
2012/0181950 A1* 7/2012 Yu ........................ H05B 45/327 315/294

FOREIGN PATENT DOCUMENTS

CN 102833916 A * 12/2012
CN 216851927 U 6/2022

OTHER PUBLICATIONS

Zhan Shuang, "Research on Link Survivability in MIMO-Based Visible Light Communication Networks", China Master's Theses Full-text Database(CMFD), 9, p. 38-41. ,Apr. 15, 2019.

* cited by examiner

*Primary Examiner* — Anh Q Tran
(74) *Attorney, Agent, or Firm* — BruceStone LLP; Joseph A. Bruce

(57) ABSTRACT

The present invention discloses a dimming circuit with a load capacity adjustment mechanism and method thereof. The dimming circuit includes a control module, a waveform switching module, a filtering module and an amplification module. The control module generates a pulse-width modulation (PWM) signal. The waveform switching module inverts the pulse-width modulation signal to generate a first conversion signal, and then inverts the first conversion signal to generate a second conversion signal. The waveform of the first conversion signal is opposite to the waveform of the PWM signal, and the waveform of the second conversion signal is the same as the waveform of the PWM signal. The filtering module filters the second conversion signal to generate a filtered signal. The amplification module processes the filtered signal to generate a dimming signal.

6 Claims, 8 Drawing Sheets

DIMMING CIRCUIT WITH A LOAD CAPACITY ADJUSTMENT MECHANISM AND METHOD THEREOF

BACKGROUND OF THE INVENTION

1. Field of the Invention

The present invention relates to a dimming circuit, in particular to a dimming circuit with a load capacity adjustment mechanism. The present invention further relates to the load capacity adjustment method of the dimming circuit.

2. Description of the Prior Art

With the advancement of technology, the functionality of lighting devices has become increasingly diverse. Lighting devices with dimming functions are widely used in various buildings due to their convenience. Currently available dimming circuits mainly achieve this functionality via special application integrated circuit (ASIC) chips. However, the stability of converting pulse-width modulation (PWM) signals into 0V-10V voltage signals in the currently available dimming circuits is poor, and the output current of most currently available dimming circuits typically ranges between 10 to 20 mA. As a result, the currently available dimming circuits are not only complex in structure, but also of high cost. Besides, the currently available dimming circuits are of low load capacity.

SUMMARY OF THE INVENTION

One embodiment of the present invention provides a dimming circuit with a load capacity adjustment mechanism, which includes a control module, a waveform switching module, a filtering module and an amplification module. The control module generates a pulse-width modulation (PWM) signal. The waveform switching module inverts the pulse-width modulation signal to generate a first conversion signal, and then inverts the first conversion signal to generate a second conversion signal. The waveform of the first conversion signal is opposite to the waveform of the PWM signal, and the waveform of the second conversion signal is the same as the waveform of the PWM signal. The filtering module filters the second conversion signal to generate a filtered signal. The amplification module processes the filtered signal to generate a dimming signal.

In one embodiment, the amplitude of the first conversion signal is greater than the amplitude of the pulse-width modulation signal. The amplitude of the second conversion signal is greater than the amplitude of the first conversion signal.

In one embodiment, the filtering module includes a first filtering unit and a second filtering unit. The first filtering unit filters the second conversion signal to generate an initial filtered signal, and the second filtering unit filters the initial filtered signal to generate the filtered signal.

In one embodiment, the initial filtered signal is a triangular wave, and the filtered signal is a direct-current (DC) signal with a stable voltage.

In one embodiment, the amplification module includes an operational amplification unit and an emitter follower unit. The operational amplification unit amplifies the filtered signal to generate an amplified signal. The emitter follower unit processes the amplified signal to generate the dimming signal.

Another embodiment of the present invention provides a load capacity adjustment method for a dimming circuit, which includes the following steps: generating a pulse-width modulation signal by a control module; inverting the pulse-width modulation signal to generate a first conversion signal, and then inverting the first conversion signal to generate a second conversion signal by a waveform switching module, wherein the waveform of the first conversion signal is opposite to the waveform of the pulse-width modulation signal, and the waveform of the second conversion signal is the same as the waveform of the pulse-width modulation signal; filtering the second conversion signal by a filtering module to generate a filtered signal; and processing the filtered signal by an amplification module to generate a dimming signal.

In one embodiment, the amplitude of the first conversion signal is greater than the amplitude of the pulse-width modulation signal. The amplitude of the second conversion signal is greater than the amplitude of the first conversion signal.

In one embodiment, the step of filtering the second conversion signal by the filtering module to generate the filtered signal includes the following steps: filtering the second conversion signal by the first filtering unit of the filtering module to generate an initial filtered signal; and filtering the initial filtered signal by the second filtering unit of the filtering module to generate the filtered signal.

In one embodiment, the initial filtered signal is a triangular wave, and the filtered signal is a DC signal with a stable voltage.

In one embodiment, the step of processing the filtered signal by the amplification module to generate the dimming signal includes the following steps: amplifying the filtered signal by the operational amplification unit of the amplification module to generate an amplified signal; and processing the amplified signal by the emitter follower unit of the amplification module to generate the dimming signal.

The dimming circuit with the load capacity adjustment mechanism and method thereof in accordance with the embodiments of the present invention may have the following advantages:

(1) In one embodiment of the present invention, the dimming circuit includes a control module, a waveform switching module, a filtering module and an amplification module. The control module generates a PWM signal. The waveform switching module inverts the pulse-width modulation signal to generate a first conversion signal, and then inverts the first conversion signal to generate a second conversion signal. The waveform of the first conversion signal is opposite to the waveform of the PWM signal, and the waveform of the second conversion signal is the same as the waveform of the PWM signal. The filtering module filters the second conversion signal to generate a filtered signal. The amplification module processes the filtered signal to generate a dimming signal. Through this signal processing mechanism, the dimming circuit can precisely adjust the value of the dimming signal to reach the desired voltage (0~10V).

(2) In one embodiment of the present invention, the waveform switching module of the dimming circuit has a special signal switching mechanism, which can perform two signal inversions on the PWM signal to generate the second conversion signal. After processing the filtered signal via the filtering module and amplification module, the dimming signal is generated. Through this signal processing mechanism, the load capacity of the dimming signal output by the dimming circuit can be significantly improved. Therefore, the efficiency of the dimming circuit can be effectively enhanced in order to meet actual requirements.

(3) In one embodiment of the present invention, the filtering module of the dimming circuit includes a first filtering unit and a second filtering unit. The first filtering unit filters the second conversion signal to generate the initial filtered signal, and the second filtering unit further filters the initial filtered signal to generate the filtered signal. Via this filtering mechanism, the dimming circuit can generate a stable DC voltage to serve as the dimming signal. Therefore, the dimming signal generated by the dimming circuit can be effectively optimized, such that the performance of the dimming circuit can be further enhanced.

(4) In one embodiment of the present invention, the amplification module of the dimming circuit includes an operational amplification unit and an emitter follower unit. The operational amplification unit amplifies the filtered signal to generate an amplified signal, and the amplified signal is processed by the emitter follower unit to generate the dimming signal. Via this mechanism, the amplification module not only provides signal amplification but also offers isolation and buffering functions with a view to optimizing the dimming signal.

(5) In one embodiment of the present invention, the dimming circuit also includes a dimming function stop module. The dimming function stop module can receive the PWM signal from the control module and shuts down the amplification circuit when the duty cycle of the PWM signal is less than 5%, thereby deactivating the dimming function of the dimming circuit. Via this dimming function stop mechanism, the dimming circuit can effectively prevent abnormal conditions in the dimming function so as to make sure that the lighting device can operate normally.

(6) In one embodiment of the present invention, the circuit design of the dimming circuit is simple and can be realized using low-cost circuit components. In this way, the dimming circuit can achieve the desired effect while reducing costs. Therefore, the dimming circuit can achieve high practicality, so the dimming circuit can be more comprehensive in application and conform to future development trends.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
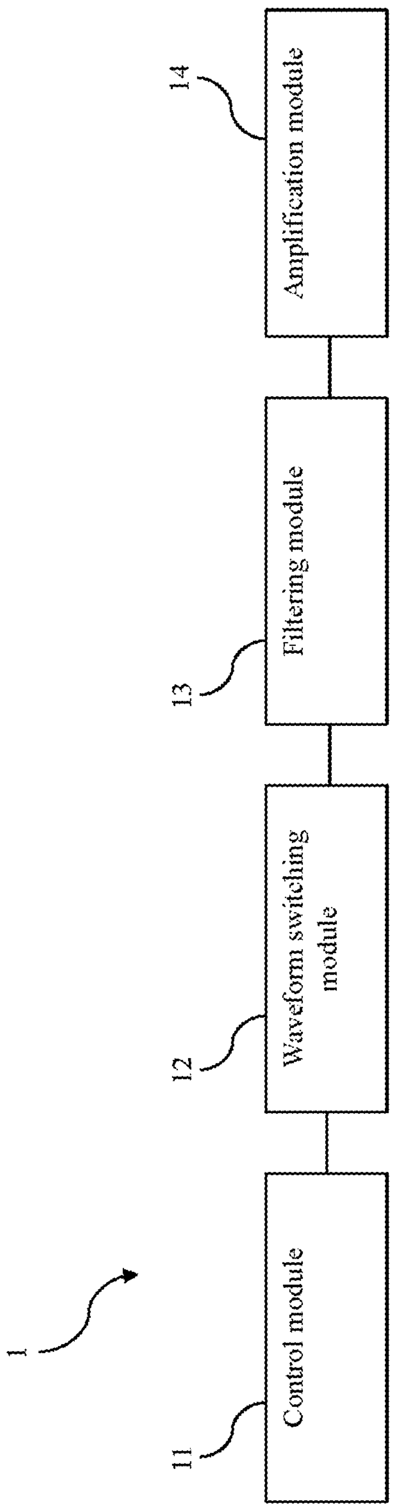
FIG. 1 is the block diagram of the circuit structure of the dimming circuit with the load capacity adjustment mechanism in accordance with the first embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which is the block diagram of the circuit structure of the dimming circuit with the load capacity adjustment mechanism in accordance with the first embodiment of the present invention. As shown in FIG. 1, the dimming circuit 1 includes a control module 11, a waveform switching module 12, a filtering module 13, and an amplification module 14.

The control module 11 generates a pulse-width modulation (PWM) signal. In one embodiment, the control module 11 can be a microcontroller (MCU), a central-processing unit (CPU), an application-specific integrated circuit (ASIC), a field-programmable gate array (FPGA), or other similar components.

The waveform switching module 12 is connected to the control module 11. The waveform switching module 12 inverts the PWM signal to generate a first conversion signal, and then inverts the first conversion signal to generate a second conversion signal. In one embodiment, the waveform switching module 12 can include a plurality of switching components (such as MOSFETS, BJTs, or other similar components). In another embodiment, the waveform switching module 12 can also be any currently available signal switching circuit. The waveform of the first conversion signal is the opposite of the PWM signal, while the waveform of the second conversion signal is the same as the PWM signal. Additionally, the amplitude of the first conversion signal is greater than that of the PWM signal, and the amplitude of the second conversion signal is greater than that of the first conversion signal.

The filtering module 13 is connected to the waveform switching module 12. The filtering module 13 filters the second conversion signal to generate a filtered signal. In one embodiment, the filtering module 13 may include a plurality of capacitors and other necessary circuit components. In another embodiment, the filtering module 13 can also be any currently available filtering circuit.

The amplification module 14 is connected to the filtering module 13. The amplification module 14 processes the filtered signal to generate a dimming signal. In one embodiment, the amplification module 14 can be a microcontroller (MCU), a central-processing unit (CPU), an application-specific integrated circuit (ASIC), a field-programmable gate array (FPGA), or other similar components.

As set forth above, the waveform switching module 12 has a special signal switching mechanism, which performs two signal conversions on the PWM signal to generate the second conversion signal, and the second conversion signal is processed by the filtering module 13 and the amplification module 14 to generate the dimming signal. This signal processing mechanism can accurately adjust the dimming signal value to achieve the desired voltage value (0-10V).

Moreover, the waveform switching module 12 has a special signal switching mechanism, which performs two signal conversions on the PWM signal to generate the second conversion signal, and the second conversion signal is processed by the filtering module 13 and the amplification module 14 to generate the dimming signal. Through the above signal processing mechanism, the load capacity of the dimming signal output by the dimming circuit 1 can be greatly improved. Therefore, the performance of the dimming circuit 1 can be effectively enhanced to meet actual requirements.

The embodiment just exemplifies the present invention and is not intended to limit the scope of the present invention; any equivalent modification and variation according to the spirit of the present invention is to be also included within the scope of the following claims and their equivalents.

Figure 2:
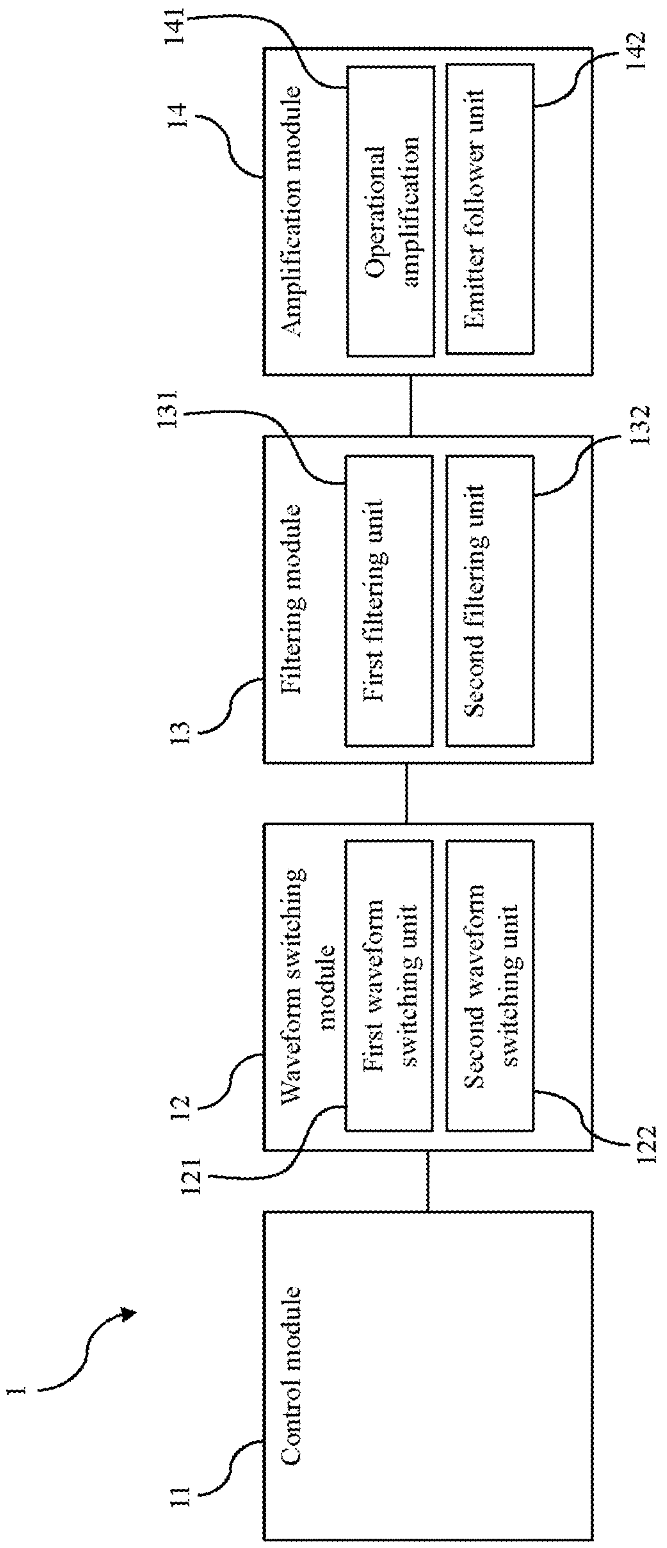
FIG. 2 is the block diagram of the circuit structure of the dimming circuit with the load capacity adjustment mechanism in accordance with the second embodiment of the present invention.

Please refer to FIG. 2, which is the block diagram of the circuit structure of the dimming circuit with the load capacity adjustment mechanism in accordance with the second embodiment of the present invention. As shown in FIG. 2, the dimming circuit 1 includes a control module 11, a waveform switching module 12, a filtering module 13, and an amplification module 14.

The control module 11 generates a PWM signal.

The waveform switching module 12 is connected to the control module 11. The waveform switching module 12 includes a first waveform switching unit 121 and a second waveform switching unit 122. The first waveform switching unit 121 inverts the PWM signal to generate a first conversion signal. The second waveform switching unit 122 inverts the first conversion signal to generate a second conversion signal. The waveform of the first conversion signal is the opposite of the PWM signal, while the waveform of the second conversion signal is the same as the PWM signal. Additionally, the amplitude of the first conversion signal is greater than that of the PWM signal, and the amplitude of the second conversion signal is greater than that of the first conversion signal.

The filtering module 13 is connected to the waveform switching module 12. The filtering module 13 includes a first filtering unit 131 and a second filtering unit 132. The first filtering unit 131 filters the second conversion signal to generate an initial filtered signal. The second filtering unit 132 filters the initial filtered signal to generate the filtered signal.

The amplification module 14 is connected to the filtering module 13. The amplification module 14 includes an operational amplification unit 141 and an emitter follower unit 142. The operational amplification unit 141 amplifies the filtered signal to generate an amplified signal, and the amplified signal is processed by the emitter follower unit 142 to generate the dimming signal. As mentioned earlier, the amplification module 14 can be a microcontroller (MCU), a central-processing unit (CPU), an application-specific integrated circuit (ASIC), a field-programmable gate array (FPGA), or other similar components. The functions of the operational amplification unit 141 and the emitter follower unit 142 can be executed by software. The operational amplification unit 141 and the emitter follower unit 142 can also be hardware components.

Similarly, the waveform switching module 12 includes a first waveform switching unit 121 and a second waveform switching unit 122, which can perform a special signal switching mechanism to execute two signal conversions on the PWM signal to generate the second conversion signal. The second conversion signal is processed by the filtering module 13 and the amplification module 14 to generate the dimming signal. This signal processing mechanism can accurately adjust the dimming signal value to achieve the desired voltage value (0-10V).

Further, in this embodiment, the filtering module 13 of the dimming circuit 1 includes a first filtering unit 131 and a second filtering unit 132. The first filtering unit 131 filters the second conversion signal to generate an initial filtered signal, and the second filtering unit 132 filters the initial filtered signal to generate the filtered signal. The initial filtered signal may be, but is not limited to, a triangular wave, while the filtered signal may be a direct-current (DC) signal with a stable voltage. Through the above filtering mechanism, the dimming circuit 1 can generate a stable DC voltage to serve as the dimming signal. Therefore, the dimming signal generated by the dimming circuit 1 can be effectively optimized, and the performance of the dimming circuit 1 can be further enhanced.

In addition, in this embodiment, the amplification module 14 of the dimming circuit 1 includes an operational amplification unit 141 and an emitter follower unit 142. The operational amplification unit 141 amplifies the filtered signal to generate the amplified signal. The emitter follower unit 142 can achieve isolation and buffering functions. After processing by the emitter follower unit 142, the amplified signal generates the dimming signal. Via the above mechanism, the amplification module 14 not only provides a signal amplification function but also offers isolation and buffering functions to further optimize the dimming signal.

The embodiment just exemplifies the present invention and is not intended to limit the scope of the present invention; any equivalent modification and variation according to the spirit of the present invention is to be also included within the scope of the following claims and their equivalents.

Figure 3:
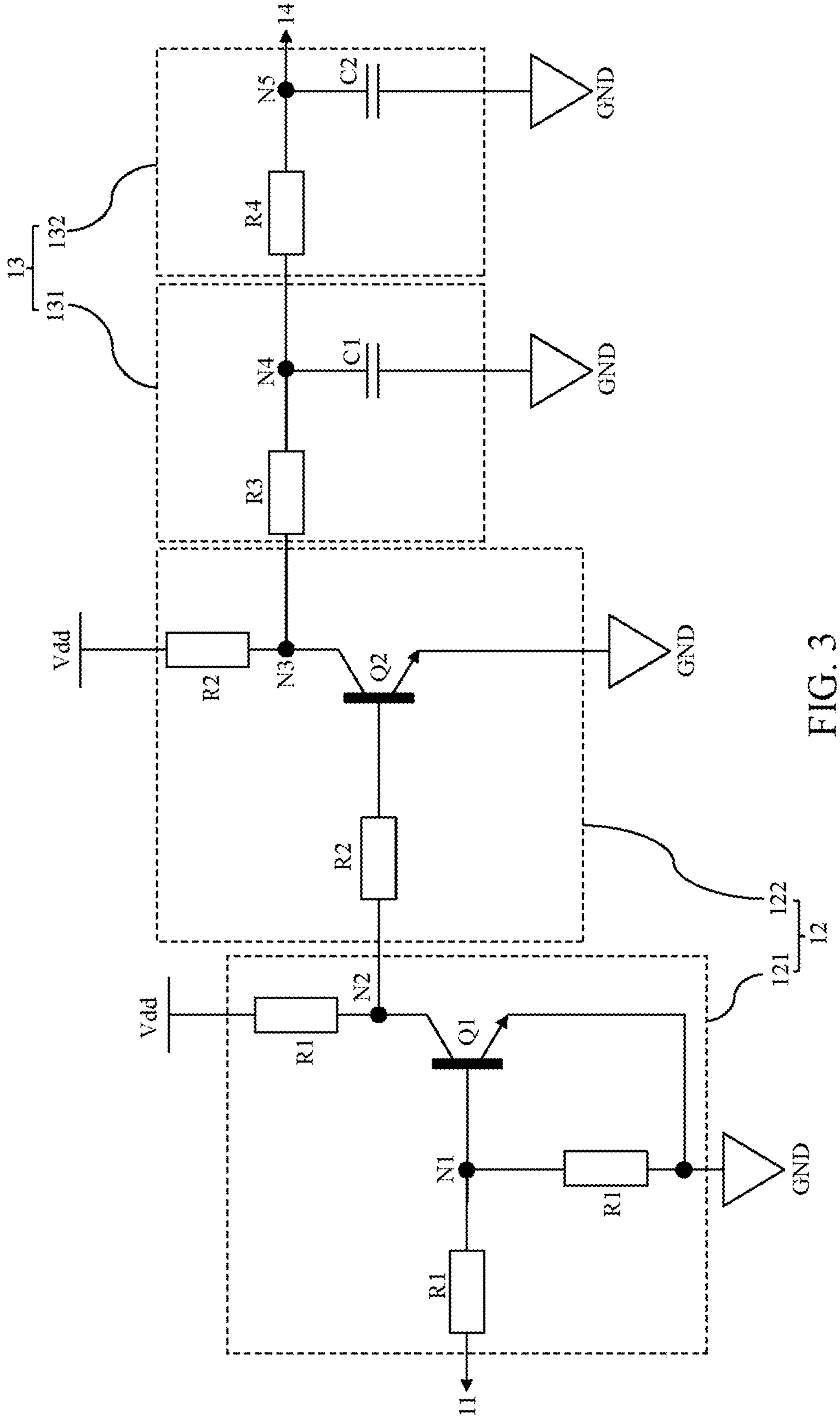
FIG. 3 is the circuit diagram of the dimming circuit with the load capacity adjustment mechanism in accordance with the second embodiment of the present invention.

Please refer to FIG. 3, which is the circuit diagram of the dimming circuit with the load capacity adjustment mechanism in accordance with the second embodiment of the present invention. This embodiment illustrates one of the circuit designs of the dimming circuit (only showing the waveform switching module 12 and the filtering module 13). The circuit design of the dimming circuit can vary according to actual needs, and the present invention is not limited to this.

As shown in FIG. 3, the waveform switching module 12 includes a first waveform switching unit 121 and a second waveform switching unit 122. The first waveform switching unit 121 includes three first resistors R1 and a first switch Q1. In one embodiment, the first switch Q1 may be a BJT. In another embodiment, the first switch Q1 can also be a MOSFET (GND stands for the ground, and Vdd stands for the operating voltage source). The second waveform switching unit 122 includes two second resistors R2 and a second switch Q2. In one embodiment, the second switch Q2 may be a BJT. In another embodiment, the second switch Q2 can also be a MOSFET (GND stands for the ground, and Vdd stands for the operating voltage source).

The filtering module 13 includes a first filtering unit 131 and a second filtering unit 132. The first filtering unit 131 includes a first capacitor C1 and a third resistor R3. The second filtering unit 132 includes a second capacitor C2 and a fourth resistor R4.

The embodiment just exemplifies the present invention and is not intended to limit the scope of the present invention; any equivalent modification and variation according to the spirit of the present invention is to be also included within the scope of the following claims and their equivalents.

Figure 4:
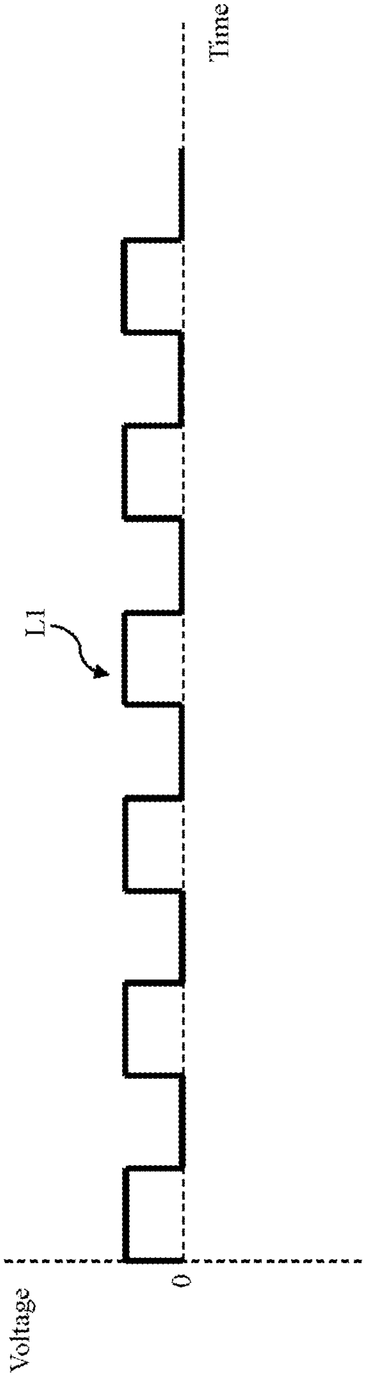
FIG. 4 is the schematic view of the PWM signal of the dimming circuit with the load capacity adjustment mechanism in accordance with the second embodiment of the present invention.

Please refer to FIG. 4, which is the schematic view of the PWM signal of the dimming circuit with the load capacity adjustment mechanism in accordance with the second embodiment of the present invention, and also refer to FIG. 3. As shown in FIG. 4, the curve L1 stands of the waveform of the PWM signal. In this embodiment, the PWM signal is the signal at the node N1, which is a square wave with a 50% duty cycle and a frequency of 1 kHz.

The embodiment just exemplifies the present invention and is not intended to limit the scope of the present invention; any equivalent modification and variation according to the spirit of the present invention is to be also included within the scope of the following claims and their equivalents.

Figure 5:
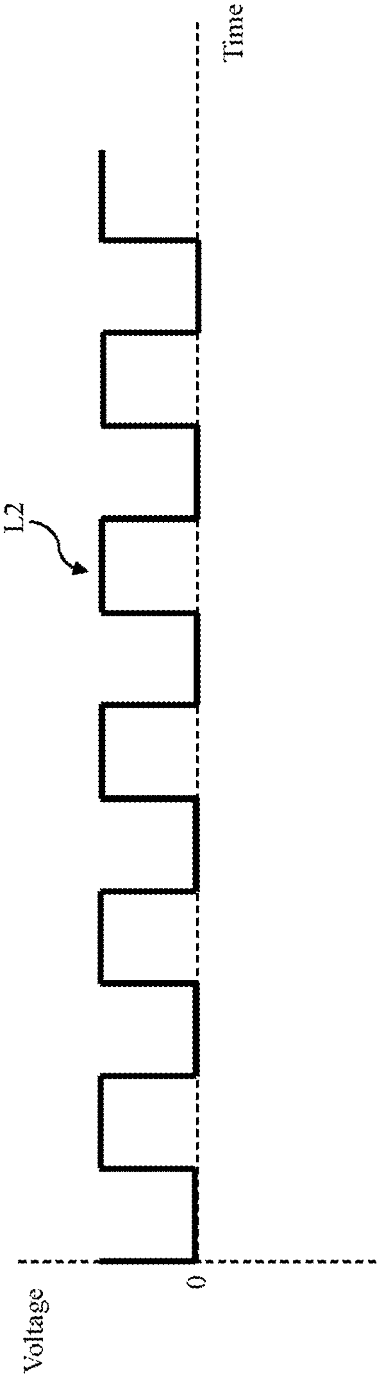
FIG. 5 is the schematic view of the first conversion signal of the dimming circuit with the load capacity adjustment mechanism in accordance with the second embodiment of the present invention.

Please refer to FIG. 5, which is the schematic view of the first conversion signal of the dimming circuit with the load capacity adjustment mechanism in accordance with the second embodiment of the present invention, and also refer to FIG. 3. As shown in FIG. 5, the curve L2 stands for the waveform of the first conversion signal. In this embodiment, the first conversion signal is the signal at the node N2. The waveform of the first conversion signal is the inverse of the PWM signal, but the amplitude of the first conversion signal is greater than that of the PWM signal.

The embodiment just exemplifies the present invention and is not intended to limit the scope of the present invention; any equivalent modification and variation according to the spirit of the present invention is to be also included within the scope of the following claims and their equivalents.

Figure 6:
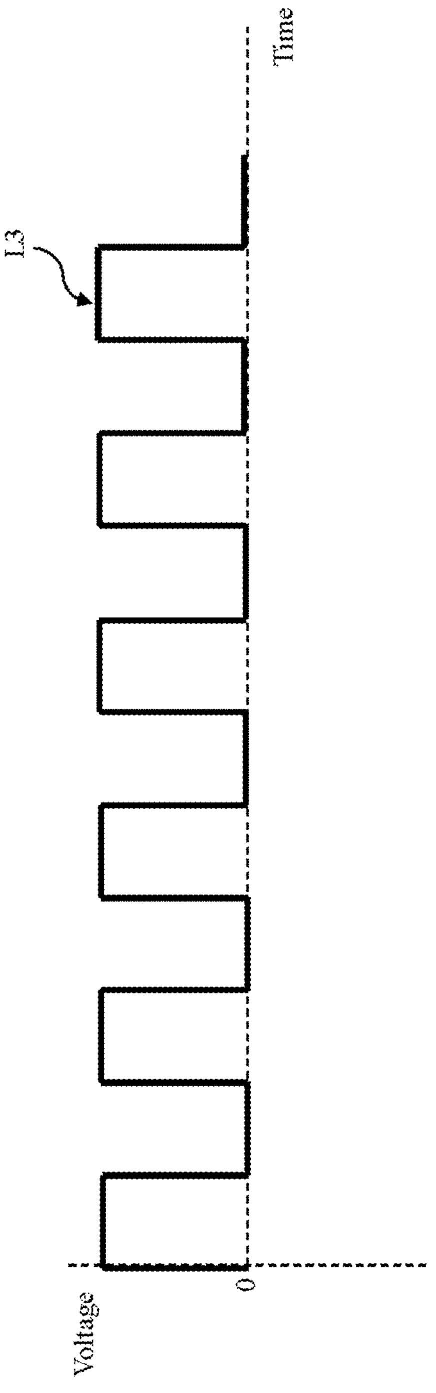
FIG. 6 is the schematic view of the second conversion signal of the dimming circuit with the load capacity adjustment mechanism in accordance with the second embodiment of the present invention.

Please refer to FIG. 6, which is the schematic view of the second conversion signal of the dimming circuit with the load capacity adjustment mechanism in accordance with the second embodiment of the present invention, and also refer to FIG. 3. As shown in FIG. 6, the curve L3 stands for the waveform of the second conversion signal. In this embodiment, the second conversion signal is the signal at the node N3. The waveform of the second conversion signal is identical to that of the PWM signal, but the amplitude of the second conversion signal is greater than that of the first conversion signal.

The embodiment just exemplifies the present invention and is not intended to limit the scope of the present invention; any equivalent modification and variation according to the spirit of the present invention is to be also included within the scope of the following claims and their equivalents.

Figure 7:
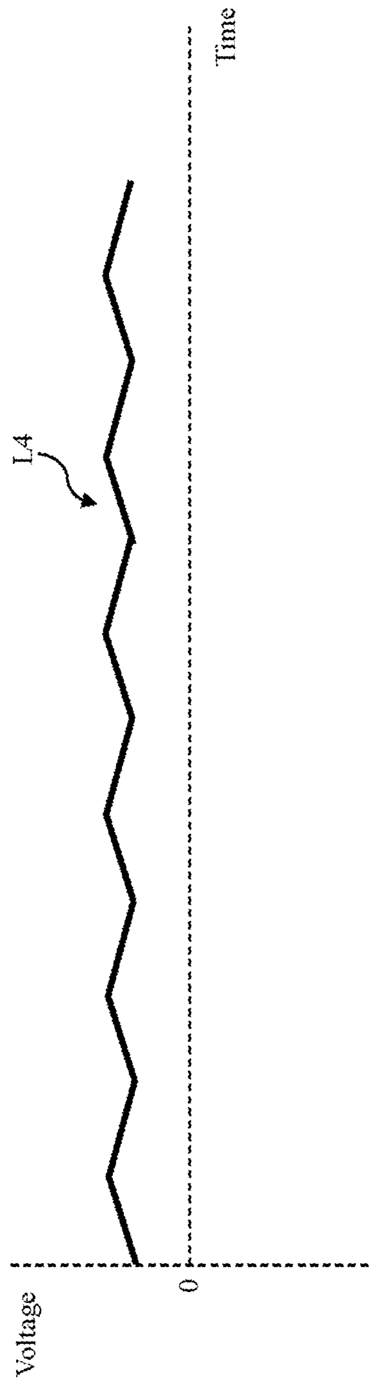
FIG. 7 is the schematic view of the initial filtered signal of the dimming circuit with the load capacity adjustment mechanism in accordance with the second embodiment of the present invention.

Please refer to FIG. 7, which is the schematic view of the initial filtered signal of the dimming circuit with the load capacity adjustment mechanism in accordance with the second embodiment of the present invention, and also refer to FIG. 3. As shown in FIG. 7, the curve L4 stands for the waveform of the initial filtered signal. In this embodiment, the initial filtered signal is the signal at the node N4, and the initial filtered signal may be a triangular wave, which is a signal with a DC component.

The embodiment just exemplifies the present invention and is not intended to limit the scope of the present invention; any equivalent modification and variation according to the spirit of the present invention is to be also included within the scope of the following claims and their equivalents.

Figure 8:
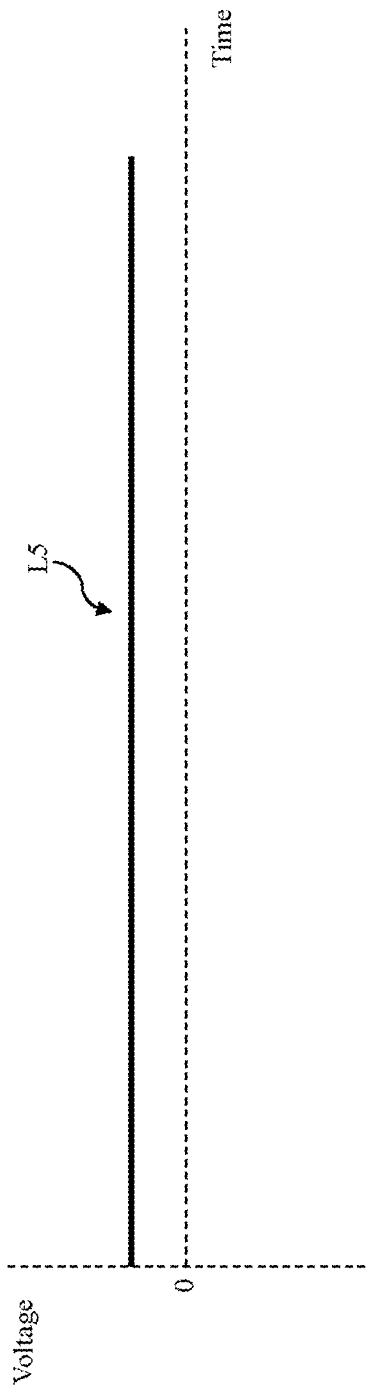
FIG. 8 is the schematic view of the filtered signal of the dimming circuit with the load capacity adjustment mechanism in accordance with the second embodiment of the present invention.

Please refer to FIG. 8, which is the schematic view of the filtered signal of the dimming circuit with the load capacity adjustment mechanism in accordance with the second embodiment of the present invention, and also refer to FIG. 3. As shown in FIG. 8, the curve L5 stands for the waveform of the filtered signal. In this embodiment, the filtered signal is the signal at the node N5, and the filtered signal may be a DC signal with a stable voltage. The filtered signal may be a DC voltage signal with a voltage value of 1V.

In this embodiment, after being processed by the amplification module 14, the filtered signal stably produces a DC voltage signal with a voltage value of 4.59V.

The embodiment just exemplifies the present invention and is not intended to limit the scope of the present invention; any equivalent modification and variation according to the spirit of the present invention is to be also included within the scope of the following claims and their equivalents.

Figure 9:
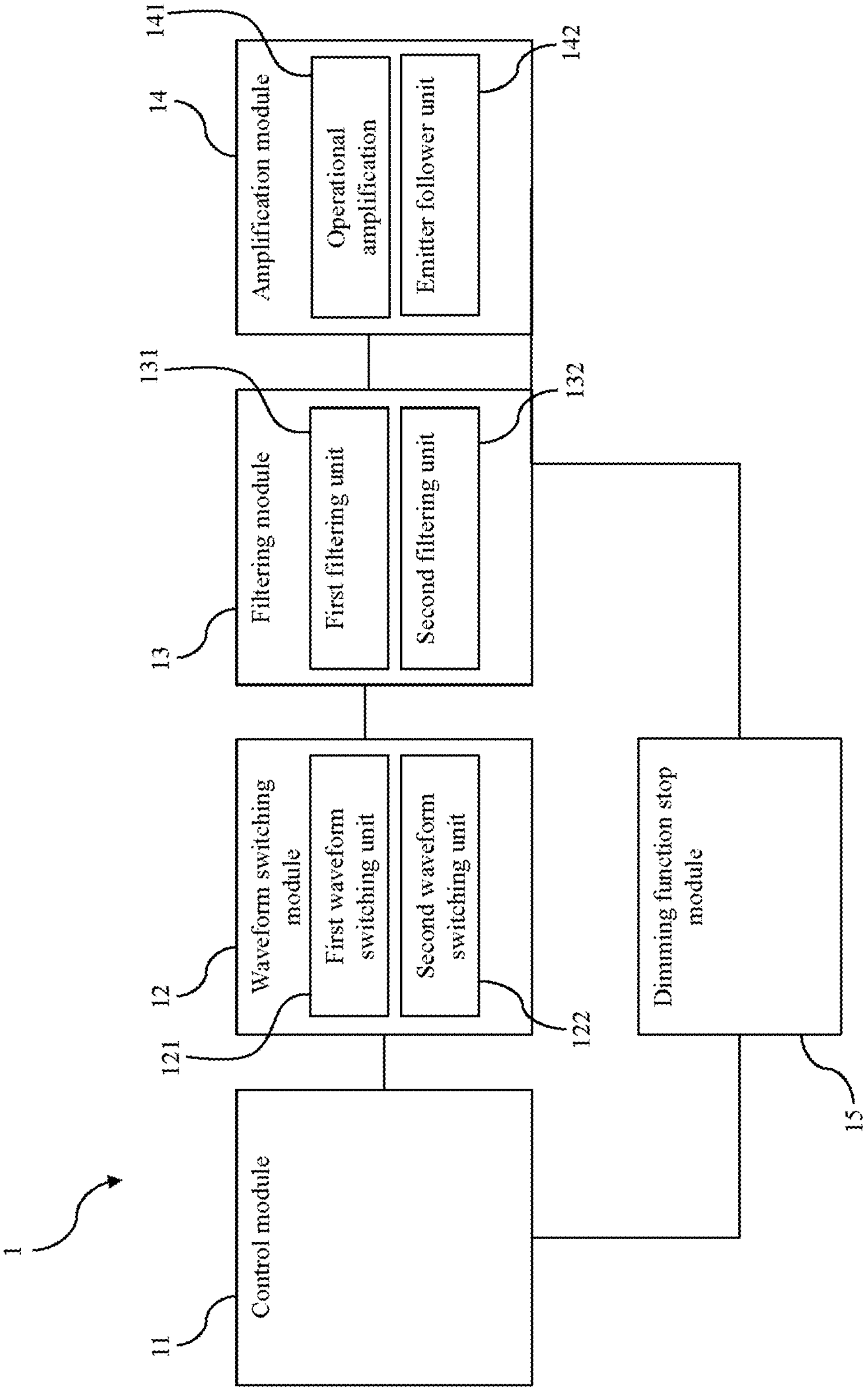
FIG. 9 is the block diagram of the circuit structure of the dimming circuit with the load capacity adjustment mechanism in accordance with the third embodiment of the present invention.

Please refer to FIG. 9, which is the block diagram of the circuit structure of the dimming circuit with the load capacity adjustment mechanism in accordance with the third embodiment of the present invention. As shown in FIG. 9, the dimming circuit 1 includes a control module 11, a waveform switching module 12, a filtering module 13, and an amplification module 14.

The waveform switching module 12 is connected to the control module 11. The waveform switching module 12 includes a first waveform switching unit 121 and a second waveform switching unit 122. The filtering module 13 is connected to the waveform switching module 12. The filtering module 13 includes a first filtering unit 131 and a second filtering unit 132. The amplification module 14 is connected to the filtering module 13. The amplification module 14 includes an operational amplification unit 141 and an emitter follower unit 142.

The above elements are the same as in the previous embodiment, so these elements will not be elaborated here. The difference between this embodiment and the previous embodiment is that the dimming circuit 1 further includes a dimming function stop module 15. The dimming function stop module 15 is connected to the control module 11 and the amplification module 14.

The dimming function stop module 15 can receive the PWM signal from the control module 11 and turn off the amplification circuit 14 when the duty cycle of the PWM signal is less than 5%, thereby disabling the dimming function of the dimming circuit 1. Through the above dimming function stop mechanism, the dimming circuit 1 can effectively prevent abnormal conditions in the dimming function in order to make sure that the lighting device can operate normally.

The waveform switching module 12 includes a first waveform switching unit 121 and a second waveform switching unit 122, which can execute a special signal switching mechanism to perform two signal conversions for the PWM signal to generate the second conversion signal. The second conversion signal is processed by the filtering module 13 and the amplification module 14 to generate the dimming signal. This signal processing mechanism can precisely adjust the dimming signal value to reach the desired voltage value (0~10V).

The embodiment just exemplifies the present invention and is not intended to limit the scope of the present invention; any equivalent modification and variation according to the spirit of the present invention is to be also included within the scope of the following claims and their equivalents.

It is worthy to point out that the currently available dimming circuits mainly achieve this functionality via ASIC chips. However, the stability of converting PWM signals into 0V-10V voltage signals in the currently available dimming circuits is poor, and the output current of most currently available dimming circuits typically ranges between 10 to 20 mA. Therefore, the currently available dimming circuits are not only complex in structure, but also of high cost. Besides, the currently available dimming circuits are of low load capacity. By contrast, according to one embodiment of the present invention, the dimming circuit includes a control module, a waveform switching module, a filtering module and an amplification module. The control module generates a PWM signal. The waveform switching module inverts the pulse-width modulation signal to generate a first conversion signal, and then inverts the first conversion signal to generate a second conversion signal. The waveform of the first conversion signal is opposite to the waveform of the PWM signal, and the waveform of the second conversion signal is the same as the waveform of the PWM signal. The filtering module filters the second conversion signal to generate a filtered signal. The amplification module processes the filtered signal to generate a dimming signal. Through this signal processing mechanism, the dimming circuit can precisely adjust the value of the dimming signal to reach the desired voltage (0~10V).

According to one embodiment of the present invention, the waveform switching module of the dimming circuit has a special signal switching mechanism, which can perform two signal inversions on the PWM signal to generate the second conversion signal. After processing the second conversion signal via the filtering module and amplification module, the dimming signal is generated. Through this signal processing mechanism, the load capacity of the dimming signal output by the dimming circuit can be significantly improved. Therefore, the efficiency of the dimming circuit can be effectively enhanced in order to meet actual requirements.

Also, according to one embodiment of the present invention, the filtering module of the dimming circuit includes a first filtering unit and a second filtering unit. The first filtering unit filters the second conversion signal to generate the initial filtered signal, and the second filtering unit further filters the initial filtered signal to generate the filtered signal. Via this filtering mechanism, the dimming circuit can generate a stable DC voltage to serve as the dimming signal. Therefore, the dimming signal generated by the dimming circuit can be effectively optimized, such that the performance of the dimming circuit can be further enhanced.

Further, according to one embodiment of the present invention, the amplification module of the dimming circuit includes an operational amplification unit and an emitter follower unit. The operational amplification unit amplifies the filtered signal to generate an amplified signal, and the amplified signal is processed by the emitter follower unit to generate the dimming signal. Via this mechanism, the amplification module not only provides signal amplification but also offers isolation and buffering functions with a view to optimizing the dimming signal.

Moreover, according to one embodiment of the present invention, the dimming circuit also includes a dimming function stop module. The dimming function stop module can receive the PWM signal from the control module and shuts down the amplification circuit when the duty cycle of the PWM signal is less than 5%, thereby deactivating the dimming function of the dimming circuit. Via this dimming function stop mechanism, the dimming circuit can effectively prevent abnormal conditions in the dimming function so as to make sure that the lighting device can operate normally.

Furthermore, according to one embodiment of the present invention, the circuit design of the dimming circuit is simple and can be realized using low-cost circuit components. In this way, the dimming circuit can achieve the desired effect while reducing costs. Therefore, the dimming circuit can achieve high practicality, so the dimming circuit can be more comprehensive in application and conform to future development trends. As set forth above, the dimming circuit with the load capacity adjustment mechanism according to the embodiments of the present invention can definitely achieve great technical effects.

Figure 10:
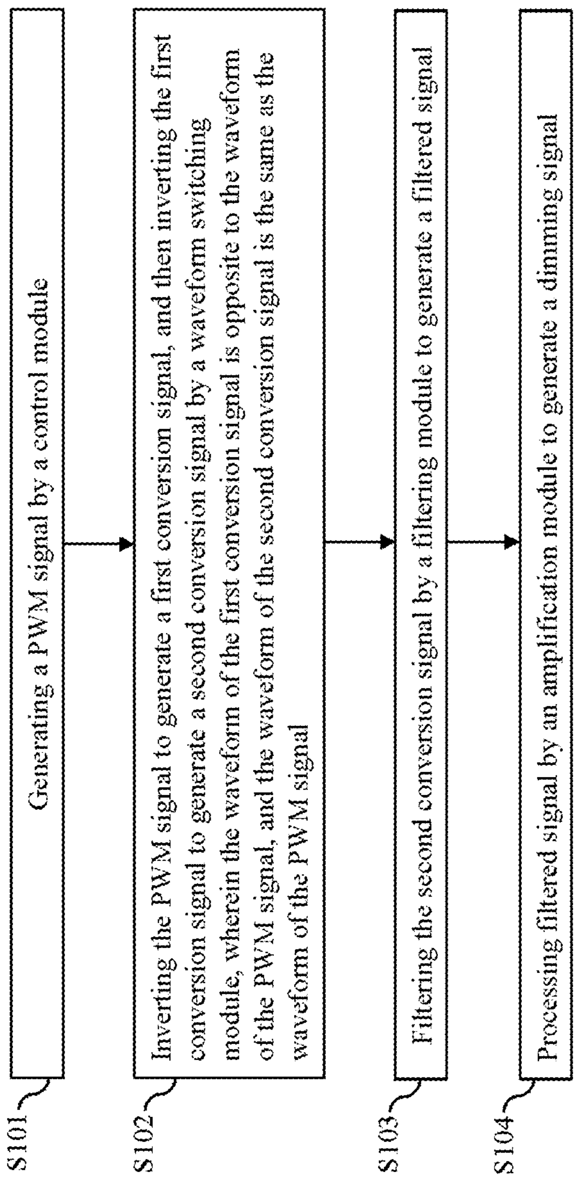
FIG. 10 is the flow chart of the load capacity adjustment method for the dimming circuit in accordance with the fourth embodiment of the present invention.

Please refer to FIG. 10, which is the flow chart of the load capacity adjustment method for the dimming circuit in accordance with the fourth embodiment of the present invention. As shown in FIG. 10, the load capacity adjustment method of the embodiment includes the following steps:

Step S101: generating a PWM signal by a control module.

Step S102: inverting the PWM signal to generate a first conversion signal, and then inverting the first conversion signal to generate a second conversion signal by a waveform switching module, wherein the waveform of the first conversion signal is opposite to the waveform of the PWM signal, and the waveform of the second conversion signal is the same as the waveform of the PWM signal. The above step includes the following step: inverting the PWM signal to generate the first conversion signal by the first waveform switching unit of the waveform switching module, and then inverting the first conversion signal to generate the second conversion signal by the second waveform switching unit of the waveform switching module.

Step S103: filtering the second conversion signal by a filtering module to generate a filtered signal. The above step includes the following steps: filtering the second conversion signal by the first filtering unit of the filtering module to generate an initial filtered signal; and filtering the initial filtered signal by the second filtering unit of the filtering module to generate the filtered signal. The initial filtered signal is a triangular wave, and the filtered signal is a DC signal with a stable voltage.

Step S104: processing the filtered signal by an amplification module to generate a dimming signal. The above step includes the following steps: amplifying the filtered signal by the operational amplification unit of the amplification module to generate an amplified signal; and processing the amplified signal by the emitter follower unit of the amplification module to generate the dimming signal.

The embodiment just exemplifies the present invention and is not intended to limit the scope of the present invention; any equivalent modification and variation according to the spirit of the present invention is to be also included within the scope of the following claims and their equivalents.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

To sum up, according to one embodiment of the present invention, the dimming circuit includes a control module, a waveform switching module, a filtering module and an amplification module. The control module generates a PWM signal. The waveform switching module inverts the pulse-width modulation signal to generate a first conversion signal, and then inverts the first conversion signal to generate a second conversion signal. The waveform of the first conversion signal is opposite to the waveform of the PWM signal, and the waveform of the second conversion signal is the same as the waveform of the PWM signal. The filtering module filters the second conversion signal to generate a filtered signal. The amplification module processes the filtered signal to generate a dimming signal. Through this signal processing mechanism, the dimming circuit can precisely adjust the value of the dimming signal to reach the desired voltage (0~10V).

According to one embodiment of the present invention, the waveform switching module of the dimming circuit has a special signal switching mechanism, which can perform two signal inversions on the PWM signal to generate the second conversion signal. After processing the second conversion signal via the filtering module and amplification module, the dimming signal is generated. Through this signal processing mechanism, the load capacity of the dimming signal output by the dimming circuit can be significantly improved. Therefore, the efficiency of the dimming circuit can be effectively enhanced in order to meet actual requirements.

Also, according to one embodiment of the present invention, the filtering module of the dimming circuit includes a first filtering unit and a second filtering unit. The first filtering unit filters the second conversion signal to generate the initial filtered signal, and the second filtering unit further filters the initial filtered signal to generate the filtered signal. Via this filtering mechanism, the dimming circuit can generate a stable DC voltage to serve as the dimming signal. Therefore, the dimming signal generated by the dimming circuit can be effectively optimized, such that the performance of the dimming circuit can be further enhanced.

Further, according to one embodiment of the present invention, the amplification module of the dimming circuit includes an operational amplification unit and an emitter follower unit. The operational amplification unit amplifies the filtered signal to generate an amplified signal, and the amplified signal is processed by the emitter follower unit to generate the dimming signal. Via this mechanism, the amplification module not only provides signal amplification but also offers isolation and buffering functions with a view to optimizing the dimming signal.

Moreover, according to one embodiment of the present invention, the dimming circuit also includes a dimming function stop module. The dimming function stop module can receive the PWM signal from the control module and shuts down the amplification circuit when the duty cycle of the PWM signal is less than 5%, thereby deactivating the dimming function of the dimming circuit. Via this dimming function stop mechanism, the dimming circuit can effectively prevent abnormal conditions in the dimming function so as to make sure that the lighting device can operate normally.

Furthermore, according to one embodiment of the present invention, the circuit design of the dimming circuit is simple and can be realized using low-cost circuit components. In this way, the dimming circuit can achieve the desired effect while reducing costs. Therefore, the dimming circuit can achieve high practicality, so the dimming circuit can be more comprehensive in application and conform to future development trends.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A dimming circuit with a load capacity adjustment mechanism, comprising:

a control module configured to generate a pulse-width modulation signal;

a waveform switching module configured to invert the pulse-width modulation signal to generate a first conversion signal, and then invert the first conversion signal to generate a second conversion signal, wherein a waveform of the first conversion signal is opposite to a waveform of the pulse-width modulation signal, and a waveform of the second conversion signal is the same as the waveform of the pulse-width modulation signal;

a filtering module comprises a first filtering unit configured to filter the second conversion signal to generate an initial filtered signal and a second filtering unit configured to filter the initial filtered signal to generate a filtered signal, wherein the initial filtered signal is a triangular wave with a direct-current component, and the filtered signal is a direct-current signal with a stable voltage; and an amplification module configured to process the filtered signal to generate a dimming signal.

2. The dimming circuit with the load capacity adjustment mechanism as claimed in claim 1, wherein an amplitude of the first conversion signal is greater than an amplitude of the pulse-width modulation signal, and an amplitude of the second conversion signal is greater than the amplitude of the first conversion signal.

3. The dimming circuit with the load capacity adjustment mechanism as claimed in claim 1, wherein the amplification module comprises an operational amplification unit and an emitter follower unit, wherein the operational amplification unit is configured to amplify the filtered signal to generate an amplified signal, and the emitter follower unit is configured to process the amplified signal to generate the dimming signal.

4. A load capacity adjustment method for a dimming circuit, comprising:

generating a pulse-width modulation signal by a control module;

inverting the pulse-width modulation signal to generate a first conversion signal, and then inverting the first conversion signal to generate a second conversion signal by a waveform switching module, wherein a waveform of the first conversion signal is opposite to a waveform of the pulse-width modulation signal, and a waveform of the second conversion signal is the same as the waveform of the pulse-width modulation signal;

filtering the second conversion signal by a first filtering unit of a filtering module to generate an initial filtered signal; and filtering the initial filtered signal by a second filtering unit of the filtering module to generate a filtered signal, wherein the initial filtered signal is a triangular wave with a direct-current component, and the filtered signal is a direct-current signal with a stable voltage; and processing the filtered signal by an amplification module to generate a dimming signal.

5. The load capacity adjustment method for the dimming circuit as claimed in claim 4, wherein an amplitude of the first conversion signal is greater than an amplitude of the pulse-width modulation signal, and an amplitude of the second conversion signal is greater than the amplitude of the first conversion signal.

6. The load capacity adjustment method for the dimming circuit as claimed in claim 4, wherein a step of processing the filtered signal by the amplification module to generate the dimming signal comprises:

amplifying the filtered signal by an operational amplification unit of the amplification module to generate an amplified signal; and processing the amplified signal by an emitter follower unit of the amplification module to generate the dimming signal.

* * * * *